July 29, 1941.   M. J. JOHNSON   2,250,712
MEANS FOR INDICATING AND/OR RECORDING UNKNOWN QUANTITIES
Filed July 9, 1938   2 Sheets-Sheet 2

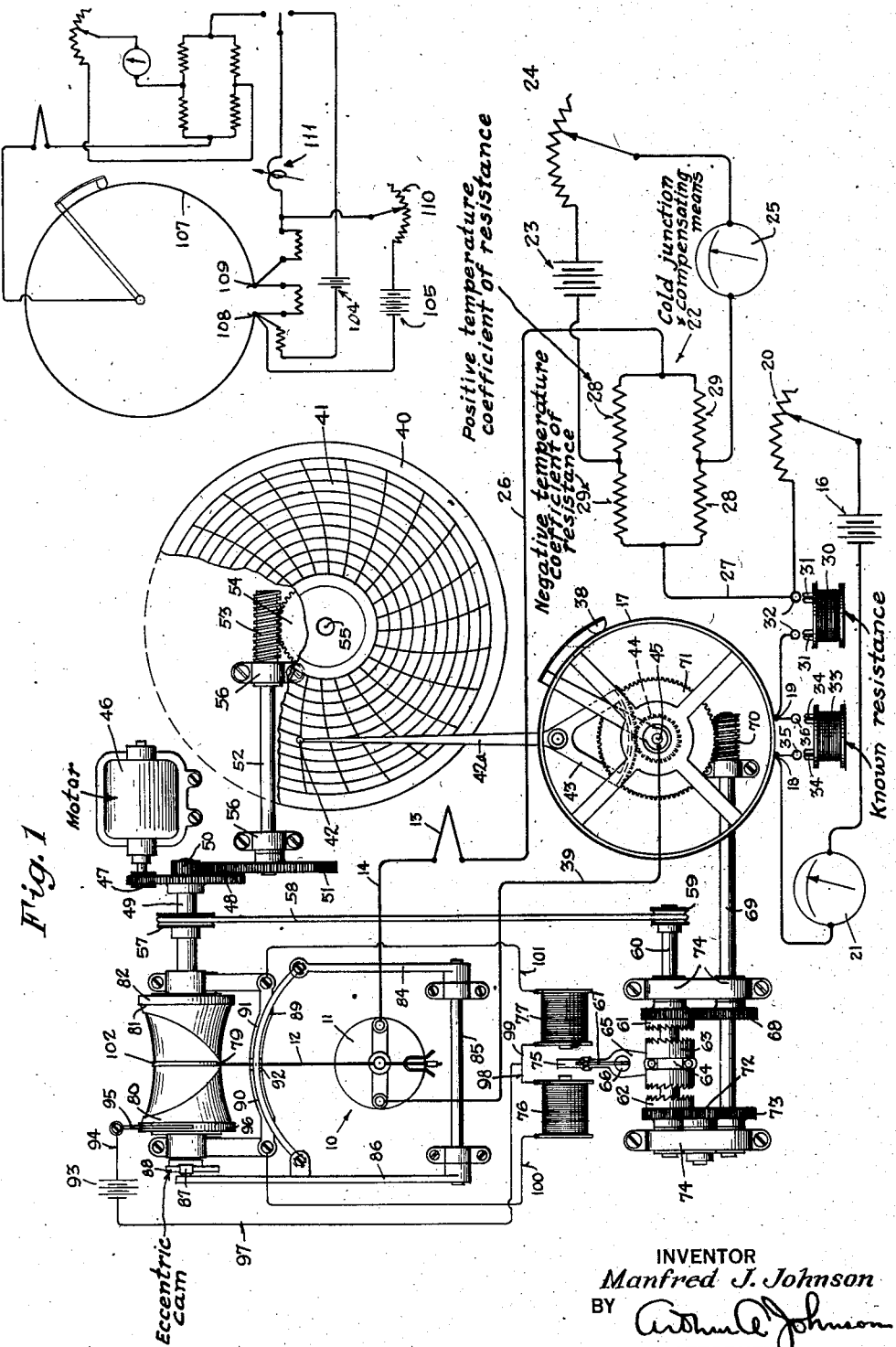

INVENTOR
Manfred J. Johnson
BY
ATTORNEY

UNITED STATES PATENT OFFICE 2,250,712

MEANS FOR INDICATING AND/OR RECORDING UNKNOWN QUANTITIES

Manfred J. Johnson, Naugatuck, Conn., assignor of one-half to The Lewis Engineering Company, Naugatuck, Conn.

Application July 9, 1938, Serial No. 218,295

8 Claims. (Cl. 73—361)

This invention relates to potentiometers, and, more particularly, to the calibrating slide wire type of instrument for indicating and recording the value of some unknown quantity, such as temperature, by measuring voltage in thermocouples set up and varying with said temperatures.

In the potentiometers previously proposed of the calibrating slide wire type, the means for compensating for variations in the temperature of the cold junction of the thermocouple were usually made a part of the slide wire, and a common battery was employed for supplying current to the slide wire as well as to the cold junction compensating means. This prior construction made accurate compensation difficult for different types of thermocouples, and presented a very serious difficulty when it was desired to change the scale range of the instrument.

According to the present invention, the means for compensating for variations in temperature of the cold end junction of the couple comprises a resistance bridge energized from an unvarying but adjustable source of E. M. F. separate from the E. M. F. source for supplying the current to the slide wire circuit. The bridge, furthermore, is provided with legs of positive temperature coefficient of resistance and legs of negative temperature coefficient of resistance such that a considerable difference in unbalance is obtained per degree in change of temperature, and, accordingly, to this system there is also a comparatively small current required of the battery energizing the bridge, and therefore this battery will remain serviceable and give constant and unvarying energy over long periods of use. As the compensating bridge is independent of the resistance of the circuit of the slide wire, the temperature or millivolt range of the instrument, when calibrated as a millivoltmeter, may be, according to the present invention, quickly and conveniently changed by a user by means of a plurality of removable calibrated resistances that are adapted to be connected into the measuring circuit.

In the preferred form of the present invention, the replaceable resistances are used for the purpose of providing a means for conveniently varying the resistance between the terminals of the slide wire, as well as to vary the value of the voltage drop across the slide wire circuit.

Accordingly, in the potentiometer of the present invention in contradistinction to those of the prior construction having a calibrating coil and cold end compensation across the ends of the slide wire, cold end compensation is accomplished by a separate bridge between the thermocouple and the slide wire independent of the resistance of the circuit of the slide wire, so that the scale range of the instrument may be changed by merely removing and replacing the calibrated resistances by like but quantitatively different resistances, so that the balancing effect of the connector circuit supplied to the calibrating slide wire will be correspondingly changed.

Furthermore, to facilitate the adjustment of the scale range of the instrument, the resistances are wound on small plug-like coils having means for quick removal and replacement in the measuring circuit. The resistances preferably bear a definite ratio one to the other, so that fractional scale changes if desired may also be had.

Other features and advantages will hereinafter appear.

In the accompanying drawings:

Figure 1 is a schematic view of the potentiometer of the present invention, diagrammatically showing the circuits employed.

Fig. 2 is a diagrammatic view of a part of the circuits employed, showing a modified form of the invention.

Figure 4:
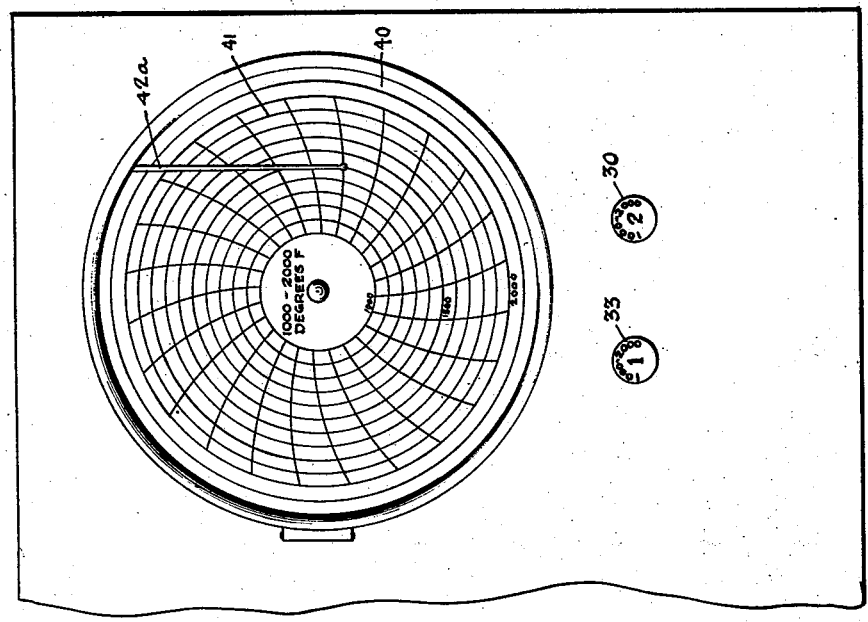
Fig. 4 is a similar view, showing a chart having a different range of temperature indication.

In the preferred embodiment of the present invention, referring now to Fig. 1 of the accompanying drawings, the balancing device comprises a galvanometer 10 including an armature 11 and a needle 12 having a normal center zero position, as shown in the figure referred to, from which it may be moved to the right or left when the galvanometer is acted upon by an E. M. F. The galvanometer 10 is in a circuit adapted to be connected to one or more thermocouples 13.

The thermocouples 13 are connected by wires 14 to certain apparatus, an unknown quantity in connection with which is to be indicated and recorded. Each thermocouple is placed in an apparatus in accordance with the usual or any known manner. When a thermocouple or other condition-responsive device, as a resistance thermometer or a manometer, is connected to the galvanometer, the current from the condition-responsive device or means controlled thereby causes the needle 12 of the galvanometer to deflect in one direction or the other. To indicate the unknown quantity which thus causes the needle to deflect, the recording instruments, such as recording potentiometers, are provided with means for applying a counter and known quantity to the galvanometer to balance the quantity applied thereto by the condition-responsive device, and since the amount of the quantity of counter effect is known in advance, the unknown quantity may be indicated or recorded by the amount of known quantity which it was necessary to apply to the galvanometer in order to return the needle to zero position.

As herein shown, this counter quantity is derived from a source of E. M. F., usually in the form of a storage battery 16, and the effect of the source of E. M. F. on the galvanometer 10 is controlled by a potentiometer slide wire 17, the potential drop across the terminals 18, 19 of the slide wire 17 being regulated by means of a variable rheostat 20 until a predetermined current measured by a milliammeter 21 flows through the slide wire circuit.

In the potentiometer of the present invention in contradistinction to the potentiometers previously proposed having a calibrating coil of cold end compensation across the end of the slide wire, compensation for temperature variations of the cold junction of the thermocouple is accomplished by a separate bridge 22 between the thermocouple and the slide wire which is independent of the resistance of the circuit of the slide wire and is supplied current from a source of E. M. F. separate and distinct from the source 16.

According to the present invention, the bridge circuit is energized to carry predetermined adjusted values of current to accurately compensate over a wide range for cold junctions of various types of couples, and said circuit has a separate battery 23 connected to an adjusting rheostat 24, the current supplied being measured by the meter 25. The battery 23 and rheostat 24 are connected through wires to opposite sides of the compensating bridge 22, which bridge is in turn connected at its opposite sides to the wires 26, 27 of the balancing circuit.

In carrying out the invention, the compensating bridge 22 is provided with two pairs of oppositely disposed resistors 28, 29 serving as legs and series connected as shown, the resistors 28 being of a material having a positive temperature coefficient of resistance and the resistors 29 being of a material having a negative temperature coefficient of resistance. It is at present preferred to make the legs 29 of nickel and the legs 28 of a copper nickel alloy such as canstantan. The bridge circuit is adjusted to give the same voltage change as the cold junction E. M. F. change of the thermocouple per degree change in temperature. That is, when the temperature of the bridge 22 and cold junction of the thermocouple changes, the drop across said bridge between the wires 26, 27 will change in a manner to compensate for the change in E. M. F. of the cold junction due to said temperature change. Also, it has been found that, by providing a bridge having one pair of legs of negative temperature coefficient of resistance and the other pair of legs of positive temperature coefficient of resistance, the difference in unbalance of the bridge per degree change of temperature is much greater than if the bridge did not have negative coefficient legs, and the compensation for variations of temperature is accomplished with the bridge operating on less current from the battery, and, therefore, said battery will give more uniform and accurate service and will last longer in use.

To obviate the necessity of changing the bridge when a different type of thermocouple is employed, the scale of the meter 25, preferably, is provided with calibrations corresponding to the different types of thermocouples so that the energizing current supplied to the bridge 22 may be adjusted in accordance with the thermocouple employed.

The compensating circuit of the present invention is adapted to be connected into the balancing circuit by means of a novel removable plug-like connector or coil 30. The connector or coil comprises a known removable resistance, and as shown is provided with a plurality of prongs 31 adapted to be inserted into suitable sockets diametrically shown at 32. A second removable plug-like resistance coil 33 is adapted to be connected across the ends of the slide wire 17 by means of contact prongs 34 insertable within suitable sockets diametrically shown at 35 and 36, electrically connected respectively to the terminals 18 and 19 of the slide wire 17.

The resistance 33 is normally used to shunt the slide wire in order that the same will have a definite known resistance. The slide wire 17 is engaged intermediate its ends by a shiftable contact 38 connected by a wire 39 to one terminal of the galvanometer 10. The terminal 19 of the slide wire 17 is connected by means of the compensating circuit to the one side of the thermocouple 13, the other side of the thermocouple being connected by the wire 14 to the other terminal of the galvanometer.

Thus, when the condition-responsive device is placed in an apparatus and responds to a certain condition, the needle 12 of the galvanometer may deflect either to the right or to the left, and it may be returned to zero position by shifting the contact point 38 relative to the slide wire 17 until a counter quantity is applied to the galvanometer by the source of E. M. F. 16. The resistance of the slide wire 17 being known and the positions of the contact 38 having been calibrated, the condition of the apparatus containing the thermocouple which is in circuit will also be known.

It should be noted that the various positions of the shiftable contact 38 of the slide wire may be indicated graphically on a disk 40 or the like containing a chart or record sheet 41 over which a marking device 42 may travel. As diagrammatically indicated in Fig. 1, this marking device is carried by a pointer 42a connected to a gear segment 43 in mesh with a gear 44 carried by a shaft 45 carrying the variable contact 38. The disk 40 may be rotated by suitable clockwork mechanism so that conditions referred to will be recorded graphically over a period of time, portions of which are indicated by previously prepared lines on the record sheet 41.

In the previously proposed instruments calibrated as a millivoltmeter, the cold end junction compensating means was made a part of the slide wire circuit, and it was difficult to change the millivolt or scale range of the instrument and generally necessitated the return of the instrument to the maker when it was desired to recalibrate the same for some new desired scale range. It will be understood that as the cold end compensating means in these prior constructions were made a part of the slide wire circuit, the resistance of the means employed was not independent of the resistance of the slide wire and any change in the resistance of the slide wire naturally affected the resistance of the compensating means which would then not function properly and the instrument became inaccurate.

In the instrument of the present invention, as the resistance of the means for compensating for errors in measurements due to variations in temperature of the cold end of the thermocouple 13 is independent of the slide wire circuit and is separately energized, the millivolt range of the instrument, and consequently the temperature range, may be easily adjusted.

As has been previously explained, the resistance afforded by the coil 33 is normally used to shunt the slide wire 17 in order that the same will have a definite known resistance, but, as will now be explained, provides in addition a means for adjusting the millivolt range of the instrument and consequently also the temperature range. The changeable resistance afforded by the coil 33, as will be understood, provides a means for conveniently changing the resistance between the terminals of the slide wire 17, and consequently the range of temperature quantitative indications controlled by the calibrating slide wire.

Accordingly, if it is desired to change the maximum range of the instrument, it is merely necessary to substitute a different chart 41 having the proper indicia indicating increments of temperature between the predetermined limits desired and remove the known resistance across the ends of the slide wire and substitute a quantitatively different one which would increase or decrease the range of the instrument from zero to the desired reading depending on the resistance of the substituted coil. The coil 30, in cases where the maximum range only of the instrument is to be changed, is merely a short circuit coil and has no resistance wound on it.

If a user desired to change the scale range of the instrument so as to obtain a suppressed zero reading, that is, a range of indications comprising a fractional part of the normal range, the coil 30 can be removed and another coil having a known calibrated resistance wound thereon may be substituted in its place, which, as will be seen from referring to the circuit diagram shown in Fig. 1, will occupy the position of a lumped resistance in the slide wire circuit, and will blanket out the lower scale reading of the instrument by changing the value of the voltage drop across the slide wire circuit.

Figure 3:
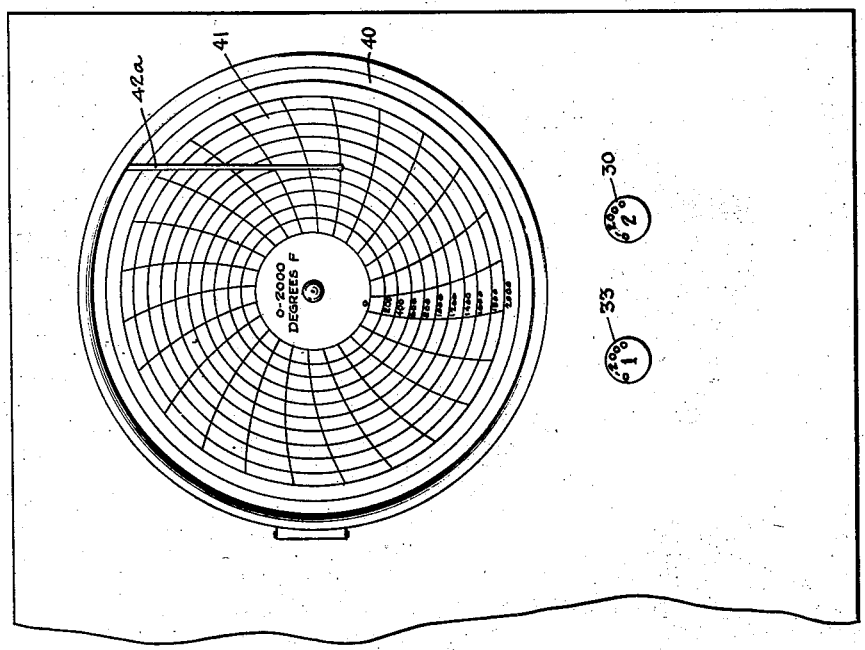
Fig. 3 is a fragmentary front elevational view of the panel of the instrument.

The coils, as previously explained, comprise plug-like units provided with suitable prongs adapted to be inserted within the respective contact sockets whereby the resistances carried thereby are made a part of the slide wire circuit. To facilitate the manipulation of the coils during an adjustment of the scale range of an instrument, the coils are, as shown by Figs. 3 and 4, conveniently disposed on the instrument panel so that the same are readily accessible. Each coil, as it is connected into the circuit by a prong-and-socket connector, may be quickly and easily removed and a new coil substituted therefor without use of any tools.

If a user of the instrument, a fragmentary part of the panel of which is shown in Fig. 3, should, for example, desire to recalibrate the instrument so as to have, instead of the scale range shown, a range of zero to 2500 degrees F., it is merely necessary to substitute for the chart 41 a new chart bearing the proper indicia and remove the coils 30 and 33 and replace the same with different coils which are intended to be furnished by the manufacturer of the instrument having the proper known resistance wound thereon. The substitution of coil marked No. 1 on which is wound resistance 33, as previously explained, alters the resistance between the terminals of the slide wire and proportionally changes the millivolt range of the instrument.

By way of example again, if a user of the instrument desires but a fractional range of 1000 to 2000 degrees F., rather than the original range of zero to 2000 degrees F., he may substitute on disk 40, a new chart 41 having indicia indicating increments between the now desired limits and replace the coil marked No. 2 in Fig. 3 with that marked No. 2 of Fig. 4, which, as will be now understood, places a definite series resistance in the slide wire circuit which alters the value of the voltage drop across the same and the instrument is now calibrated for the new range indicated by the new chart.

It will be understood, however, that if the maximum limit of the scale range is also to be changed, then it would be necessary to substitute a different calibrated resistance between the terminals of the slide wire.

According to the present invention, for reasons which will appear below, it is preferable to rotate the disk 40 by a synchronous motor 46 through a suitable train of gearing. To this end, the motor has a pinion 47 meshing with a gear 48 on a shaft 49 carrying a pinion 50 meshing with a gear 51 on a second shaft 52 having a worm 53 engaging a worm wheel 54 connected to a shaft 55 carrying the disk 40. The shaft 52 is mounted in suitable bearings 56.

In accordance with the invention herein disclosed, the power for adjusting the slide wire contact 38 is derived from the motor 46 which operates the recording disk 40 as pointed out above. As has been described hereinabove, the motor 46 has a pinion 47 meshing with the gear 48 on the shaft 49. The shaft 49 has a pulley 57 carrying a belt 58 leading to a pulley 59 on a drive shaft 60, having loosely mounted thereon, combined gear and clutch members 61 and 62 and having between the members 61 and 62 a clutch member 63 splined on the shaft 60. The clutch member 63 has an annular groove 64 operated by a forked arm 65 pivoted at 66 and the forked arm 65 and clutch 63 are held in neutral position between the members 61 and 62 by a spring 67.

When the clutch member 63 is moved to the right, as viewed in Fig. 1, it engages the member 61 which meshes with a gear 68 on a shaft 69 having a worm 70 engaging a worm wheel 71 connected to the shaft 45 carrying the slide wire contact 38 and thus causes the slide wire contact to move in one direction.

When, however, the clutch member 63 is moved to the left, it engages the member 62 which meshes with a reverse gear 72 meshing with a gear 73 on the shaft 69 causing the slide wire contact 38 to be moved in the reverse direction. The shafts 60 and 69 and the reverse gear 72 are mounted in suitable bearings 74. The upper end of the clutch shifter 65 forms an armature 75 for a pair of electromagnets 76 and 77, and it is by means of these electromagnets that the constantly rotating motor is made operative to cause the slide wire to move in one direction or the other.

The movements of the slide wire in one direction or the other are controlled by the off-zero movements of the galvanometer needle 12, and in accordance with the direction of such off-zero movement. To this end, the galvanometer needle is provided with a contact 79 cooperating with contacts 80 and 81 on a drum 82 carried by the shaft 49. The cylindrical surface of the drum is made concave, and the degree of concavity thereof corresponds with an arc drawn about the pivot pin of the galvanometer needle 12. The contact 79 of the galvanometer needle 12 is substantially tangential to the cylindrical surface of the drum and contacts thereon but is normally spaced therefrom, and hence the relation between the contact and the cylindrical surface of the drum remains substantially constant through the entire range of movement of the galvanometer needle. The length of the needle therefore may be reduced and the dimensions of the apparatus diminished. The contact member 79 of the galvanometer needle 12 normally is spaced away from the surface of the drum and out of contacting position so that the needle is free to shift under the very feeble torque of the galvanometer. Means are provided for bringing the contact 79 into contacting position during each revolution of the shaft 49 which depresses the galvanometer needle to bring the contact 79 into contacting position with the drum and to lock or hold the galvanometer needle against turning.

Accordingly, to bring the contact 79 into contacting position, there is provided a yoke 84 pivoted on a shaft 85 and having an arm 86 including a follower 87 engaging an eccentric cam 88 mounted on the shaft 49. During each revolution of the shaft 49, the yoke is allowed to fall and depress the galvanometer needle to bring the contact 79 into contacting position with the drum 82 and to lock or hold the galvanometer needle against turning. The locking is effected by reason of an anvil 89 located under the yoke 84 and between which and the yoke the needle 12 is locked when the yoke is depressed.

The contacts 80 and 81 are electrically connected together and the directional control of the device is affected by contacts 90 and 91 lying on the anvil 89. These contacts 90 and 91 are separated by insulation 92.

Current for controlling the electromagnets 76 and 77 may be supplied from any suitable source, as, for example, a battery 93, and is led therefrom by a wire 94 to a brush 95 engaging a collector ring 96 in permanent electrical connection with the contacts 80 and 81. From the other side of the battery, current flows through wire 97 to branches 98 and 99 to the electromagnets 76 and 77. The electromagnets 76, 77 are connected respectively by wires 100 and 101 to the contacts 90 and 91.

The movements of the slide wire contact 38 are controlled quantitatively by contacts 80 and 81 on the drum 82; and, accordingly, these contacts are wider on their outside ends and taper off toward the center of the drum, that is, the zero position of the needle 12. The remaining surface of the drum is made so as not to constitute a contact by being cut away, and, in such cases, at the zero position the drum carries an annulus 102 of insulating material against which the contact 79 may be pressed in the zero position of the needle 12. If desired, the nonconducting portion of the drum may be produced by enameling or painting the same with some suitable insulating material.

When the apparatus is in operation, the needle 12 is depressed periodically to bring the contact 79 into contacting relation with the drum. If the needle 12 has been deflected toward the left, as shown in Fig. 1, the contact 79 will be brought into engagement with the contact 80 and the needle itself will be brought into engagement with the directional contact 90. This will close the circuit through the battery 93 and the electromagnet 76, thereby causing the armature 75 to move the clutch member 63 into engagement with the member 61 which, as will be understood, causes movement of the slide wire counterclockwise. The extent of movement of the slide wire contact 38 will, of course, depend upon the width of the contact 80 at the point at which the needle contact 79 engages the same. If the needle 12 is deflected toward the right, as shown in Fig. 1, the circuit will be closed between the drum contact 81 and the anvil contact 91, thus causing the electromagnet 77 to be energized and causing the slide wire to be moved clockwise through the shaft 69, reverse gear 72, clutch member 63 and armature 75. The contacts 80, 81 and the slide wire and mechanical parts operating the same may be so arranged that in a single adjusting operation the system may be balanced, thereby avoiding step-by-step adjustments of the slide wire to bring the circuit unit into balance and indicate the unknown quantity.

In the form of my invention shown in Fig. 2, which is a diagrammatic view of the circuits employed when a standard cell 104 is used in place of the milliammeter 21, the counter quantity is derived from a source of E. M. F., usually in the form of a storage battery 105 and the effect of the source of E. M. F. on the galvanometer, not shown, is controlled by the potentiometer slide wire 107, and, as in the preferred form of the invention, the potential drop across the terminals 108, 109 is regulated by an auxiliary resistance 110 in comparison with the standard cell 104 by means of a galvanometer 111.

In the form of the invention just described, a greater degree of accuracy is permitted than in the preferred form of the invention, but is not practical in applications where extremely low temperatures and excessive vibration is encountered.

Variations and modifications may be made within the scope of this invention and portions of the improvements may be used without others.

I claim:

1. In an indicating instrument having a member adapted to be variously positioned over a scale having readings within predetermined limits and divided into increments indicating quantities within such limits; a potentiometer circuit including a slide wire having a movable part controlling the position of said member to indicate quantities according to a predetermined plan; a thermoelectric couple included in a circuit therefor; separately energized bridge means in said thermoelectric couple circuit for automatically compensating for errors in measurements due to changes in temperature of the cold end of said couple, the resistance of which is independent of the resistance of the slide wire; and means for determining the value of the voltage drop across the slide wire circuit, said means being removable from said circuit for replacement by a like but quantitatively different means to change the value of the voltage drop across the slide wire circuit so as to raise or lower the lower limit of reading indicated by the member cooperating with the scale in accordance with a different predetermined plan.

2. In an indicating instrument having a member adapted to be variously positioned over a scale having readings within predetermined limits and divided into increments indicating quantities within such limits; a potentiometer circuit including a source of current and a slide wire having a movable part controlling the position of said member to indicate quantities according to a predetermined plan; a thermoelectric couple included in a circuit therefor connected to said potentiometer circuit; means in said thermoelectric couple circuit for automatically compensating for errors in measurements due to changes in temperature of the cold end of said couple, said means including a bridge energized from a source of current separate from the one first mentioned, the resistance of which bridge is independent of the slide wire; and means interconnecting the slide wire proper and the cold end compensation means for determining the value of the voltage drop across the slide wire circuit, said means being removable from said circuit for replacement by a like but quantitatively different means to vary the value of the voltage drop across the slide wire circuit so as to raise or lower the lower limit of reading indicated by the member cooperating with the scale in accordance with a different predetermined plan.

3. In a pyrometer of the potentiometer type, a potentiometer circuit including a slide wire having a movable member; a pointer associated with said potentiometer and controlled by said movable member to indicate quantities according to a predetermined plan; a thermocouple; a circuit for said thermocouple adapted to be connected to said potentiometer circuit; means for automatically compensating for errors in measurements due to changes in temperature of the cold end of said thermoelectric couple including a bridge resistance in the couple circuit independent of the resistance of the slide wire; means for connecting said couple circuit to the potentiometer circuit, said means including a known resistance and adapted to determine the value of the voltage drop across the slide wire circuit, and being manually removable for substitution of a similar but quantitatively different resistance whereby the lower limit of measurement of the instrument may be raised or lowered in accordance with the lower limit on the scale chosen for use in the instrument.

4. In a temperature measuring instrument of the type described, a calibrating slide wire; a thermoelectric couple included in a circuit connected to said slide wire; means for automatically compensating for errors in measurements due to changes in temperature of the cold end of the thermoelectric couple including a separately energized bridge having a resistance which is independent of the resistance of the slide wire; and means for adjusting the millivolt range of the instrument whereby the scale of the instrument may be correspondingly adjusted, said means including manually removable resistance means replaceable with like but quantitatively different resistance means, at least some of said means being series connected in the slide wire circuit for changing the resistance of said circuit, the others being shunted across the terminals of the slide wire proper for changing the resistance between said terminals.

5. In a temperature measuring instrument of the type described, a calibrating slide wire; a thermoelectric couple; means for automatically compensating for errors in measurements due to changes in temperature of the cold end of the thermoelectric couple including a separately energized bridge, the resistance of which is independent of the resistance of the slide wire; and means for adjusting the millivolt range of the instrument whereby the scale of the instrument may be correspondingly adjusted, said means including a manually removable resistance comprising a plug-like coil adapted to be connected across the terminals of the slide wire for altering the resistance between the same and being replaceable by a like but quantitatively different resistance.

6. An indicating instrument comprising a deflector operating on the zero principle; means, including a thermoelectric couple, for causing an unknown quantity to act on the deflector; means, including a balancing circuit, for applying a counter quantity to the deflector; means for automatically compensating for modifications in said unknown quantity due to changes in temperature of the cold end of the thermoelectric couple including a separately energized bridge, the resistance of which is independent of the resistance of said balancing circuit; and means for adjusting the scale range of the instrument including means for varying the effect of the counter quantity, said means comprising a plurality of calibrated resistances manually replaceable by like but quantitatively different resistances, at least one of said resistances being insertable into the balancing circuit to vary the value of the voltage drop across said circuit.

7. An indicating instrument comprising a deflector operating on the zero principle; means, including a thermoelectric couple, for causing an unknown quantity to act on the deflector; means, including a calibrating slide wire, for applying a counter quantity to the deflector; means for automatically compensating for errors in measurements due to changes in temperature of the cold end of the thermoelectric couple including a separately energized bridge, the resistance of which is independent of the resistance of the slide wire; and means for adjusting the scale range of the instrument including means for varying the effect of the counter quantity, said means comprising a plurality of calibrated resistances replaceable by like but quantitatively different resistances, at least one of said resistances comprising a shunt resistance across the terminals of the slide wire proper and adapted to alter the resistance between the terminals of the same.

8. An indicating instrument comprising a deflector operating on the zero principle; a pointer adapted to be variously positioned over a scale having readings within predetermined limits and divided into increments indicating quantities within such limits; circuit means, including a thermoelectric couple, for causing an unknown quantity to act on the deflector; circuit means, including a calibrating slide wire and a movable contact, for applying a counter quantity to said deflector, said contact controlling the position of the pointer relative to said scale to indicate the counter quantity according to a predetermined plan; means for automatically compensating for errors in measurements due to changes in temperature of the cold end of the thermoelectric couple including a separately energized bridge, the resistance of which is independent of the resistance of the slide wire; and means for changing the limits of the quantitative indications controlled by the contact of the slide wire, said means including series resistance in the slide wire circuit for changing the effect of the counter quantity drop across the same, and shunt resistance across the terminals of the slide wire proper for changing the resistance between said terminals, said resistances being removable for substitution of similar but quantitatively different resistances whereby the limits of quantitative indications controlled by the contact may be changed in accordance with a scale having readings within different predetermined limits.

MANFRED J. JOHNSON.